United States Patent [19]

Ozeki et al.

[11] Patent Number: 4,511,208
[45] Date of Patent: Apr. 16, 1985

[54] OPTICAL COMMUNICATION SYSTEM

[75] Inventors: Takeshi Ozeki; Toshifumi Tamura, both of Tokyo, Japan

[73] Assignee: Tokyo Shibaura Denki Kabushiki Kaisha, Kawasaki, Japan

[21] Appl. No.: 439,547

[22] Filed: Nov. 5, 1982

[30] Foreign Application Priority Data

Nov. 26, 1981 [JP] Japan .................. 56-189544
Jul. 12, 1982 [JP] Japan .................. 57-119931
Jul. 20, 1982 [JP] Japan .................. 57-125002
Jul. 28, 1982 [JP] Japan .................. 57-130224

[51] Int. Cl.³ .............................................. G02B 5/14
[52] U.S. Cl. ................................. 350/96.16; 455/606
[58] Field of Search ............... 350/96.16; 455/606, 455/607

[56] References Cited

U.S. PATENT DOCUMENTS 3,874,781 4/1975 Thiel ................... 350/96.16
3,883,217 5/1975 Love et al. ............ 350/96.16
4,072,399 2/1978 Love .................... 455/606 X
4,341,438 7/1982 Seki et al. ............ 350/96.16

FOREIGN PATENT DOCUMENTS 50-39403 4/1975 Japan .

OTHER PUBLICATIONS

"Fibernet: Multimode Optical Fibers for Local Computer Networks", *IEEE Transactions on Communications*, vol. COM-26, No. 7, pp. 983-990, Jul. 1978; E. G. Rawson et al.

*Primary Examiner*—William L. Sikes
*Assistant Examiner*—Akm E. Ullah
*Attorney, Agent, or Firm*—Cushman, Darby & Cushman

[57] ABSTRACT

An optical communication system includes a plurality of stations and at least two passive optical couplers. Each of the couplers has at least four pairs of ports, each pair including an input port and an output port. An optical signal inputted to any one of the input ports is outputted to all of the output ports except the output port of the pair into which the optical signal was inputted. A plurality of optical signal transmission lines interconnect the passive optical couplers and connect the passive optical couplers to the stations. Passive optical couplers of both the transmission type and the reflection type are disclosed. The transmission type passive optical couplers rely either upon the direct interconnection of the appropriate input ports and output ports or upon diffraction to guide optical signals to the correct output ports. The reflection type passive optical couplers rely upon a diffraction grating or a plurality of reflective surfaces to direct incoming optical signals to the appropriate output ports.

24 Claims, 48 Drawing Figures

F I G. 18
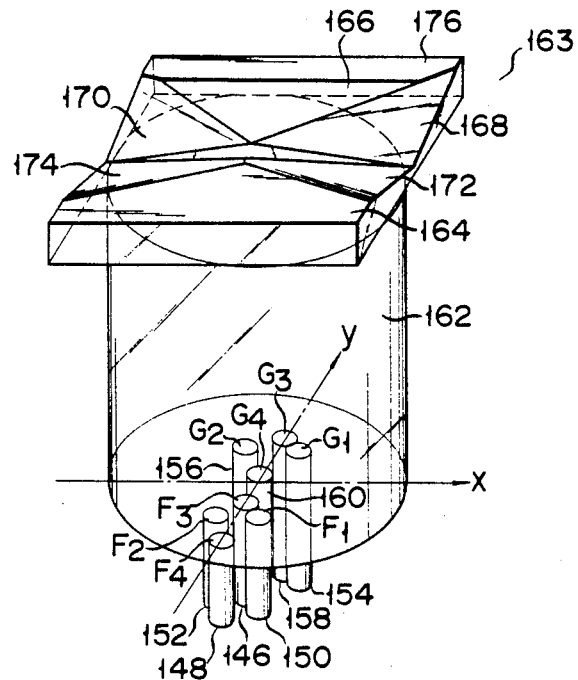
F I G. 19
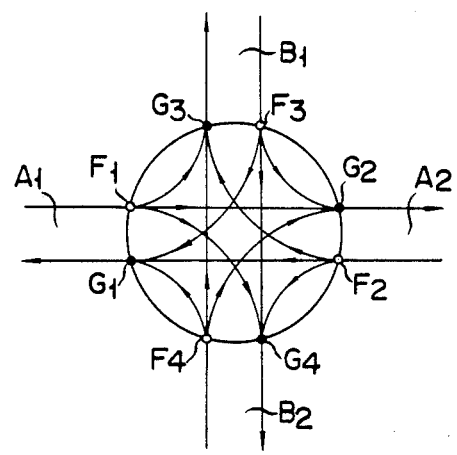

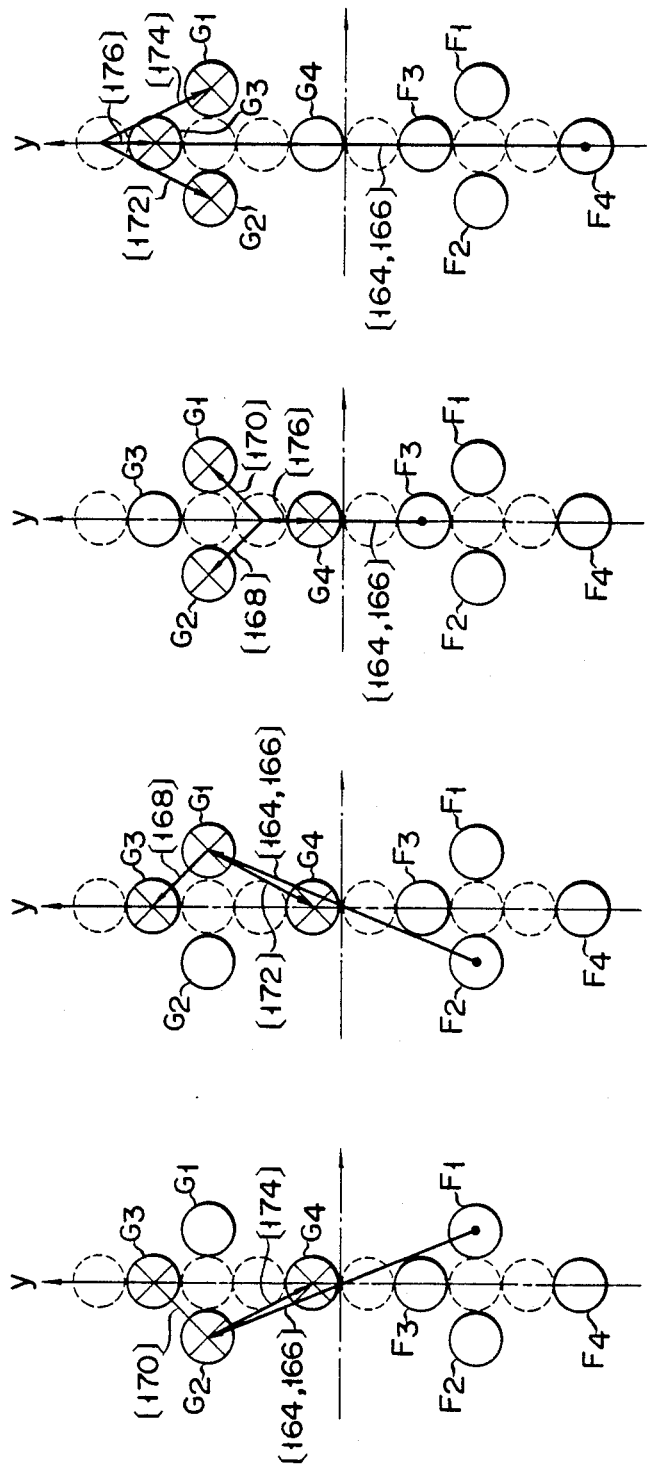

F I G. 30
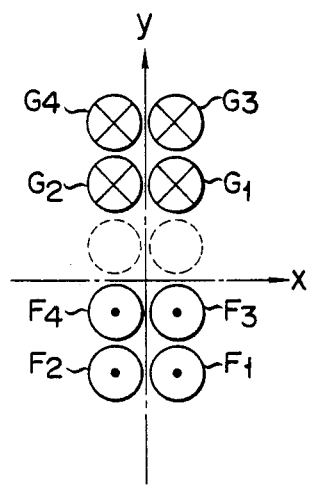
F I G. 31
F I G. 32
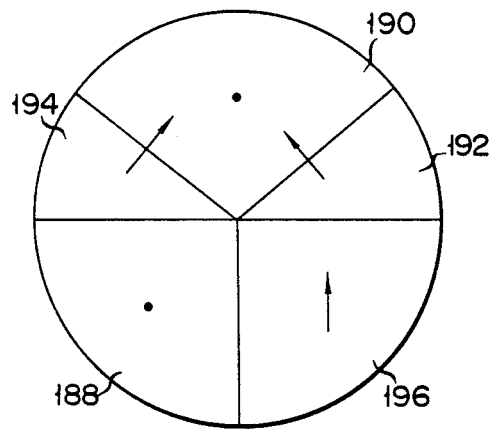
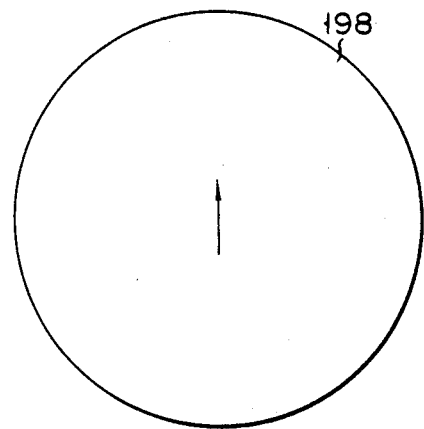

OPTICAL COMMUNICATION SYSTEM

BACKGROUND OF THE INVENTION

This invention relates generally to optical communication systems for interconnecting a plurality of remotely located stations.

There are generally two types of communication systems using optical fibers. One is an active type system in which an optical signal received at a repeater at each station is changed into an electrical signal, and then is changed back into an optical signal. Another is a passive type system in which an optical signal received at each station is transmitted as it is, after being added with other optical signals, or being branched.

It is impossible to transmit information in the former system even if one of the repeaters fails or goes off. However, it is possible to communicate between two stations in the latter system if only the two stations are operating. Therefore, the latter system is employed in many cases.

There are roughly two types of known passive systems as described in U.S. Pat. No. 3,883,217. One system employs tee couplers 10 as shown in FIG. 1.

Another system employs a star coupler 12 as shown in FIG. 2. In the two figures, stations 14 each includes an electrical unit 16 for generating and processing information, and an optical converter 18.

Optical converters 18 change electrical signals from electrical units 16 into optical signals and vice versa. Optical transmission lines 20 transmit optical signals between tee couplers 10 and optical converters 18. Further, there are common optical signal transmission lines 22 in the system using tee couplers.

Since tee couplers 10 are inserted into a common optical signal transmission channel, the light loss increases proportional to the number of stations. Therefore, a system using tee couplers 10 is disadvantageous due to the limited number of stations 14 that can be interconnected as described in U.S. Pat. No. 3,883,217.

Since an optical signal passes only once through star coupler 12 in the FIG. 2 system, light loss does not increase with an increase in the number of stations 14 except for power splitting loss. However, optical signal transmission lines 20 become very long because each station 14 is connected to the common star coupler 12. Furthermore, an increase in the number of stations 14 raises the cost to lay optical signal transmission lines 20.

Yet another optical communication system is known as shown in FIG. 3. The system has plural sub star couplers 24 in addition to one main star coupler 26.

However, each star coupler 24 and 26 outputs an input signal to all ports equally. Thus, oscillation may occur between main star coupler 26 and any sub star coupler 24. This oscillation may be prevented by inserting between main star coupler 26 and each sub star coupler 24 a gateway which controls the passage of signals. However, the use of gateways makes the system complicated.

Also, each optical transmission way is branched as a tree. The number of stations is limited for this reason.

SUMMARY OF THE INVENTION

It is one object of this invention to provide an optical communication system in which many stations may be interconnected without increased light loss and construction cost.

It is another object of this invention to provide an optical communication system having a simple structure and no danger of oscillation.

An optical communication system in accordance with this invention includes at least two passive optical couplers, each having at least four pairs of ports. Each of the pairs includes an input port and an output port. An optical signal inputted to an input port of one of the pairs is outputted to the output ports of all the pairs except the output port of the pair receiving the signal. Therefore, the system has simple structure and no danger of the oscillation.

Also, the system in accordance with this invention comprises a number of stations. Each of the stations includes circuitry for generating and processing optical signals, at least two passive optical couplers as described above, and a number of optical signal transmission lines connected to the stations.

Therefore, the system is able to interconnect many stations without an increase in light loss and construction cost.

BRIEF DESCRIPTION OF THE DRAWINGS

Other objects and features of the invention will become apparent to those skilled in the art as disclosure is made in the following description of preferred embodiments of the invention, as illustrated in the accompanying sheets of drawings, in which:

FIG. 18 shows a perspective view of another embodiment of an optical coupler of the reflection type in accordance with the present invention;

FIG. 19 shows a characteristic view of passive optical coupler having four pairs of ports in accordance with the present invention;

FIGS. 22, 23, 24 and 25 show schematic views to explain the reflecting condition of optical signals inputted to input ports on the embodiment shown in FIG. 19;

FIGS. 30, 31 and 32 show schematic views to explain the structure of the embodiment shown in FIG. 29;

DESCRIPTION OF THE PREFERRED EMBODIMENTS

Figure 1:
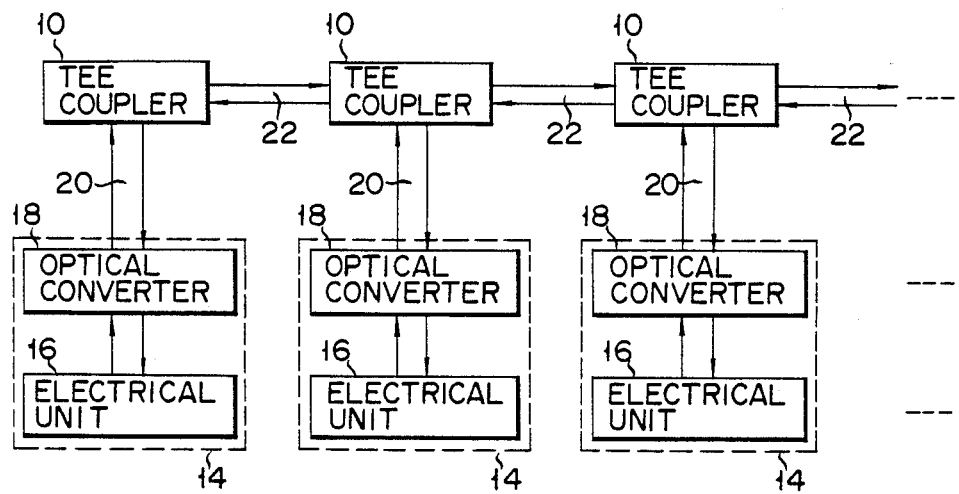
FIG. 1 shows a schematic diagram of a portion of a prior art communication system.
Figure 2:
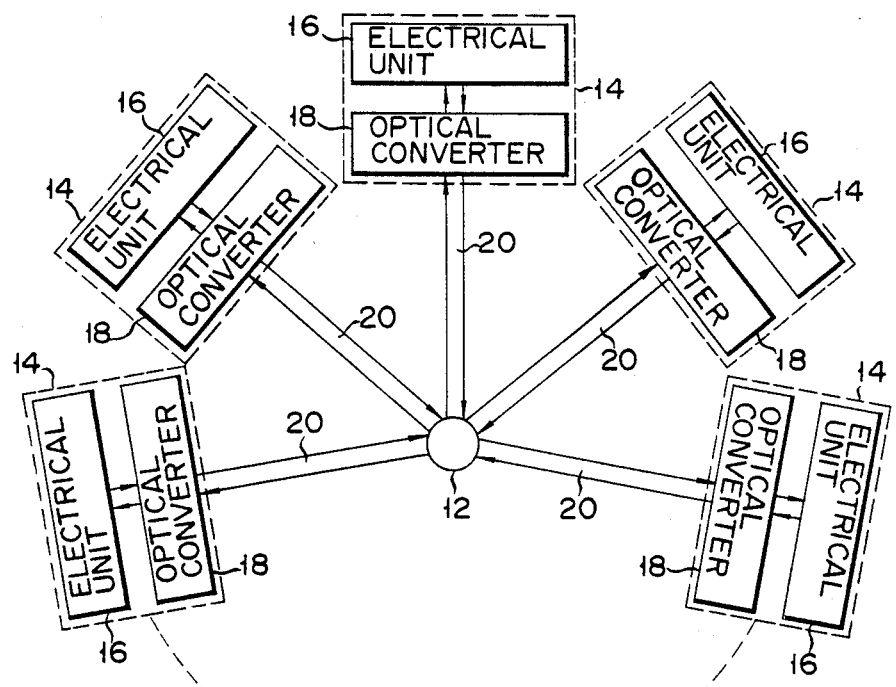
FIG. 2 shows a schematic diagram of a portion of another prior art communication system.
Figure 3:
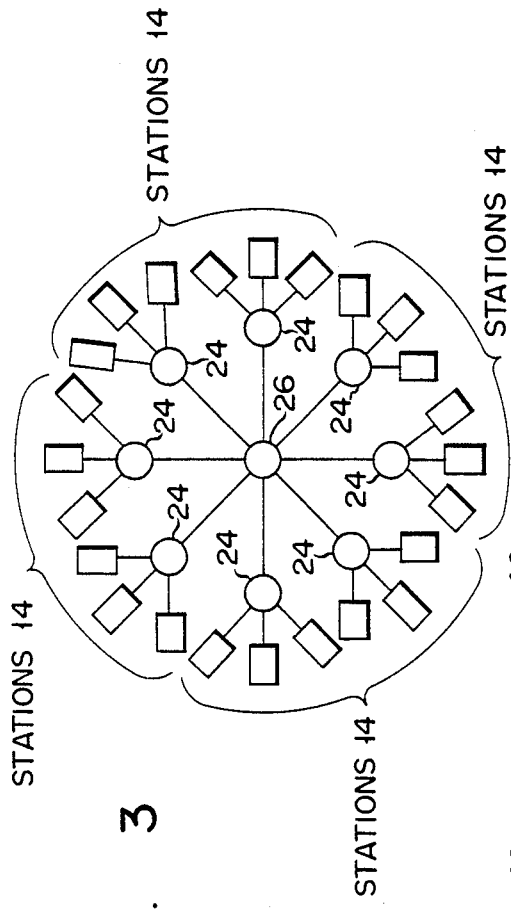
FIG. 3 shows a schematic diagram of yet another prior art communication system.

Referring now to the drawing, several embodiments by the present invention will be explained.

Figure 4:
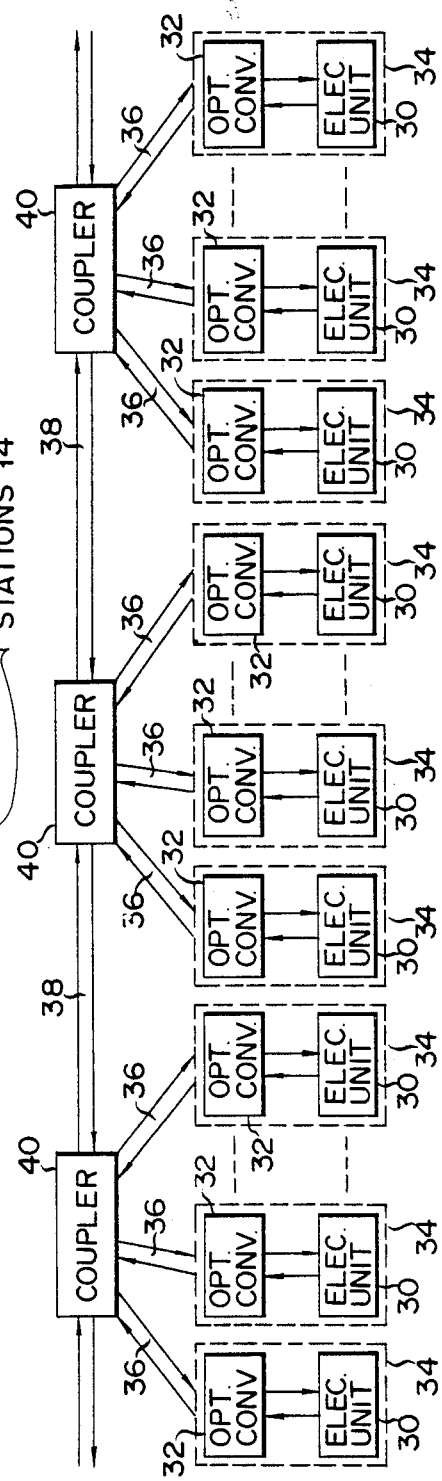
FIG. 4 shows a schematic diagram of a portion of a communication system in accordance with the present invention.

FIG. 4 shows a portion of one embodiment of an optical communication system. A plurality of electrical units 30 for generating and processing electrical signals are associated with a plurality of optical converters 32 for changing electrical signals from electrical units 30 into optical signals and vice versa. Each electrical unit 30 and optical converter 32 pair constitutes a station 34.

Each branch optical transmission line 36 includes two optical fibers. One transmits optical signals from an optical converter 32 to a passive optical coupler 40. Another optical fiber transmits optical signals in the other direction. Main optical signal tranmission lines 38 transmit optical signals between passive optical couplers 40. Each main optical signal transmission line 38 also includes two optical fibers which transmit optical signals in opposite directions.

Suppose the optical communication system has N passive optical couplers 40, each of which has M+2 pairs of ports. A pair of ports consists of one input port and one output port. Each of M and N is an integer bigger than 1. Two pairs of ports of each optical coupler are used to transmit optical signals to adjacent couplers and to receive optical signals from adjacent couplers by way of main optical signal transmission lines 38. The other M pairs of ports of each optical coupler are used to transmit optical signals to M stations and to receive optical signals from the M stations by way of M optical transmission lines 36. Therefore, the communication system has $M \times N (=S)$ stations.

The oscillation phenomenon referred to above as existing in the prior art, results from optical signals being reflected back into the passive optical coupler of their origin. For instance, optical signals coming into a first passive optical coupler 40 are transmitted to a second adjacent passive optical coupler 40 through one of the two optical fibers constituting main optical transmission line 38. A part of the optical signals coming into the second optical coupler 40 is transmitted back to the first optical coupler 40 by way of the other optical fiber of main optical transmission line 38. A part of the optical signals coming back into the first optical coupler 40 is transmitted to the second, adjacent optical coupler 40 by way of the previous optical fiber of transmission line 38. The result is oscillation.

However, each of the passive optical couplers 40 in accordance with this invention has the characteristic that a signal inputted to an input port of one pair of ports is outputted to output ports of all pairs except the output port of the one pair which received the input signal. Therefore, oscillations are suppressed.

Figure 5:
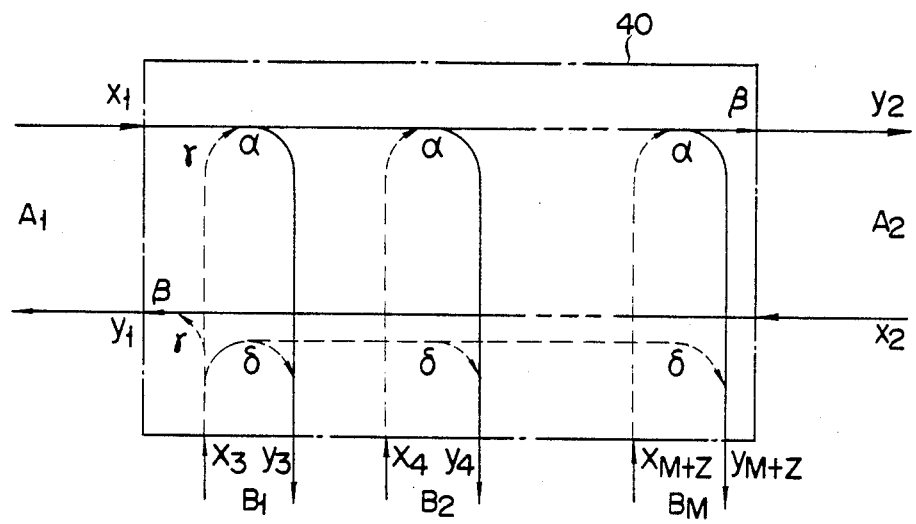
FIG. 5 shows a model of a general optical coupler.

A passive optical coupler having such a characteristic will now be theoretically explained by using FIG. 5. In FIG. 5, two pairs of ports of passive optical coupler 40 are bus ports $A_1$ and $A_2$ which may typically be connected to two main optical signal transmission lines. M pairs of ports of passive optical coupler 40 are branch ports $B_1, B_2, \ldots, B_M$ which may typically be connected to M branch optical signal transmission lines.

$x_1$ and $x_2$ represent the input optical power inputted to each input port of the two bus ports. $x_3, x_4, \ldots, x_{M+2}$ represent the input optical power inputted to each input port of the M branch ports. $y_1$ and $y_2$ represent the output optical power outputted to each output port of the two bus ports. $y_3, y_4, \ldots, y_{M+2}$ represent the output optical power outputted to each output port of the M branch ports.

Optical power input/output characteristics of coupler 40 are given in the form using a scattering matrix as follows:

$$\begin{pmatrix} y_1 \\ y_2 \\ y_3 \\ \vdots \\ \\ \\ y_{M+2} \end{pmatrix} = \begin{pmatrix} 0 & \beta & \gamma & \gamma & \ldots & \gamma \\ \beta & 0 & \gamma & \gamma & \ldots & \gamma \\ \alpha & \alpha & 0 & \delta & \ldots & \delta \\ \alpha & \alpha & \delta & 0 & \ldots & \delta \\ \vdots & & & & & \vdots \\ \alpha & \alpha & \delta & \delta & \ldots & 0 \end{pmatrix} \begin{pmatrix} x_1 \\ x_2 \\ x_3 \\ \vdots \\ \\ \\ x_{M+2} \end{pmatrix}$$

Where $\beta$ denotes the transfer coefficient between bus ports $A_1$ and $A_2$, namely ($x_1 \rightarrow y_2$) and ($x_2 \rightarrow y_1$). $\alpha$ denotes the transfer coefficient from bus ports $A_1$, $A_2$ to branch ports $B_1, B_2, \ldots, B_M$, namely ($x_1 \rightarrow y_3, y_4, \ldots, y_{M+2}$) and ($x_2 \rightarrow y_3, y_4, \ldots, y_{M+2}$). $\gamma$ denotes the transfer coefficient from branch ports $B_1, B_2, \ldots, B_M$ to bus ports $A_1, A_2$, namely ($x_3, x_4, \ldots, x_{M+2} \rightarrow y_1$) and ($x_3, x_4, \ldots, x_{M+2} \rightarrow y_2$). $\delta$ denotes the transfer coefficient among branch ports $B_1, B_2 \sim B_M$, namely ($x_3, x_4, \ldots, x_{M+2} \rightarrow y_3, y_4, \ldots, y_{M+2}$). The elements along the major diagonal from top left to bottom right in the scattering matrix are zeroes. This means that an optical signal inputted to an input port of one of the bus ports or branch ports does not output through the output port of the same port. Practically, couplers having the characteristic that the major diagonal elements from top left to bottom right in the scattering matrix are sufficiently small are applicable to this invention.

The relationship of the maximum optical loss to the number of ports M or the number of stations S will now be explained. The maximum loss in an optical transmission network is given by a channel connecting the end groups of the optical transmission network to each other. In the case that passive optical couplers 40 have identical specifications entirely, the maximum optical loss ($L_{max}$) is represented by the following equation:

$$L_{max} = -10 \log (\gamma \beta^{N-2} \alpha) + (N-1) L_f + N \cdot L_e$$

where $L_f$(dB) designates a loss of optical power in the channel between respective adjacent optical couplers 40 and $L_e$ (dB) designates a loss due to insertion of optical couplers 40. Meanwhile, the minimum optical loss ($L_{min}$) is given as a loss due to a channel between the branch ports in the same group or between the adjacent groups as follows:

$$L_{min} = M_{min}[L_e - 10 \log \delta, 2L_e + L_f - 10 \log (\alpha \gamma)]$$

There is also the following restrictive conditions among the above elements $\alpha$, $\beta$, $\gamma$, and $\delta$ for each of optical couplers 40 because respective optical couplers 40 are composed of passive devices which carry out branching or insertion of optical signals.

$$\beta + M \cdot \alpha \leq 1$$

$$2\gamma + (M-1)\delta \leq 1$$

Moreover, assuming that all of optical fibers comprising main optical signal transmission lines 38 have the identical core diameter and the identical number of openings in the incoherent optical system, the following equations are obtained on the basis of the Liouville principle:

$$\beta + M \cdot \gamma \leq 1$$

$$2\alpha + (M-1)\delta \leq 1$$

Thus, it will be understood from those conditions that the foregoing parameters $\alpha$, $\beta$, $\gamma$ and $\delta$ should be optimized and determined to meet the following equations in order to minimize the maximum optical loss ($L_{max}$):

$$\beta_{opt} = (N-2)/N$$

$$\beta_{opt} = \gamma_{opt} = 2/(M \times N)$$

The optimized maximum optical loss ($L_{max,opt}$) may therefore be given as follows:

$$L_{max,opt} = -10 \log \left\{ \frac{(1 - \beta_{opt})^2}{M^2} \cdot \beta N - 2 \right\} + (N-1) L_f + N \cdot L_e$$

The preceding equation designates the relation between the total number of stations S and the maximum optical loss ($L_{max,opt}$). The relation is shown in FIG. 6 with the number M of stations included in each group being as a parameter, here $L_e = 1$ dB.

Figure 6:
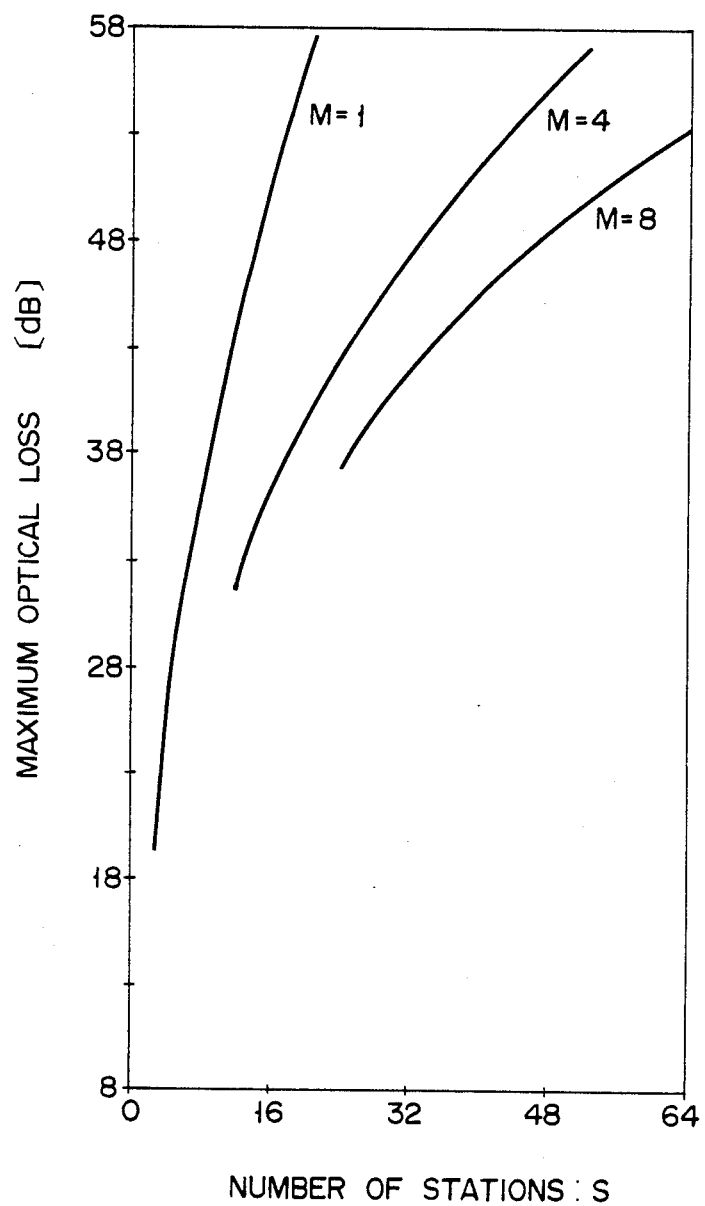
FIG. 6 shows a graph of the relationship between the number of station (S) and the maximum optical loss in accordance with the present invention.

As $M = 1$ means that each passive optical coupler 40 has only one branch, a characteristic given by a parameter of $M = 1$ in FIG. 6 corresponds to that of the prior system using tee couplers. As is clear from the characteristics shown in FIG. 6, the maximum optical loss ($L_{max,opt}$) is significantly improved compared with the prior system.

Generally, when transmitting optical information with a predetermined quality of transmission, the power of the received light must be maintained above a predetermined value and this in turn allows an optical loss just below a predetermined value. Therefore, it becomes possible to increase the number of stations S while maintaining such optical loss below the predetermined value. In other words, high quality transmission of optical information can be performed among a number of stations with less optical loss.

Generally speaking, assuming that the total number of stations S is the same, the system having more branch ports has the smaller optical loss. However, this results in the system totally having longer transmission lines. In this invention, M must be selected in consideration of these conditions.

A dynamic range required for optical receivers in such an optical transmission network will be described. The dynamic range needed for the optical receivers is given as a difference between the maximum optical loss ($L_{max}$) and the minimum optical loss ($L_{min}$) in the transmission network. A narrower dynamic range is more preferable for practical use, because manufacturing of the optical receivers is facilitated correspondingly. In this connection, the maximum optical loss ($L_{max}$) is given as ($L_{max,opt}$) on the optimized conditions of parameters for the optical couplers as stated above, whereas the minimum optical loss ($L_{min}$) is indefinite and varies depending on the parameter $\delta$ as is clear from the aforesaid formula of ($L_{min,opt}$). Now, when the parameter $\delta$ is given by $$\delta_{max} = \frac{1 - \frac{4}{M \cdot N}}{M - 1}$$

and assuming its maximum value, the dynamic range D is represented when $N \geq 3$ as follows:

$$D = -10 \log (\gamma_{opt} \beta_{opt} \alpha_{opt}) + 10 \log \delta_{max} + (N-1) L_f + (N-1) L_e$$

Figure 7:
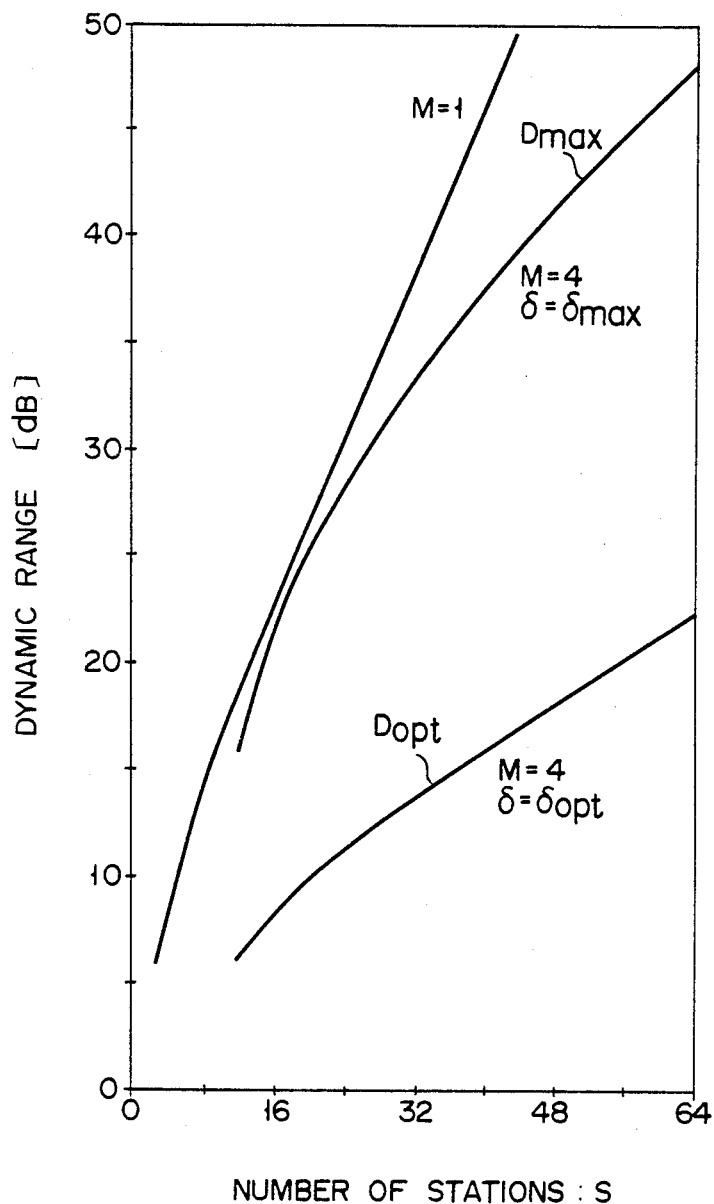
FIG. 7 shows a graph of the relationship between the number of station (S) and the required dynamic range in accordance with the present invention.

FIG. 7 shows the relation between the dynamic range D and the number S of stations with $\delta$ being a parameter in the case of $M = 4$.

Taking account here of the fact that $\delta$ is indefinite in a range given by the above equation, it becomes feasible to provide $$\delta = \delta_{opt}$$

on the following condition $$10 \log \frac{\gamma_{opt} \cdot \alpha_{opt}}{\delta_{opt}} = L_e + L_f$$

so as to make a loss which occurred through the channel in the same group equal with that which occurred through the channel between the adjacent groups. Then the dynamic range ($D_{opt}$) is given as follows:

$$D_{opt} = -10 \log (\beta_{opt}{}^{N-2}) + (N-2) L_f + (N-2) L_e$$

Therefore, the optimized dynamic range ($D_{opt}$) shows a characteristic curve as illustrated in FIG. 7 with respect to the number S of stations, and the dynamic range required for the optical receivers is significantly reduced. As a result, this makes it possible to raise the limit on specifications for the optical receivers and to realize the optical communication apparatus with ease.

In this respect, optimization of the value is carried out, for example, by adding a proper loss to the transmission channels for optical information. More concretely, optimization can be easily realized by interposing a light absorbing medium in the channels or by applying axial distortion to the optical fibers.

The optical transmission network with such an arrangement as mentioned above has highly advantageous effects in practical use for the following reasons:

(a) The maximum optical loss ($L_{max}$) is lowered and this makes it possible to increase the number S of stations or increase the distance between adjacent stations.

(b) The overall length of the optical transmission paths necessary for connecting the stations to one another is reduced.

(c) A level of reliability needed for the optical connectors for use in connecting the optical transmission paths and the optical couplers becomes less strict.

(d) Parameters for each optical coupler are so optimized that the dynamic range needed for the optical receivers can be narrowed.

Besides, the present invention is not limited to the foregoing embodiment. For example, the number of branch ports of each optical coupler may be decided in accordance with specifications. The number S of stations can be optionally determined so far as S is within a range of N×M. In addition, the optical couplers comprising a passive device may have various structures. In short, it should be understood that many changes and modifications may be made in this invention without departing from the scope of the essence thereof.

Now, several embodiments of passive optical couplers in accordance with the present invention will be explained concretely. There are two types of these optical couplers. One is a transmission type in which an optical signal transmits through the optical couplers. Another is a reflection type in which an optical signal is reflected by reflectors in the optical couplers.

Figure 10:
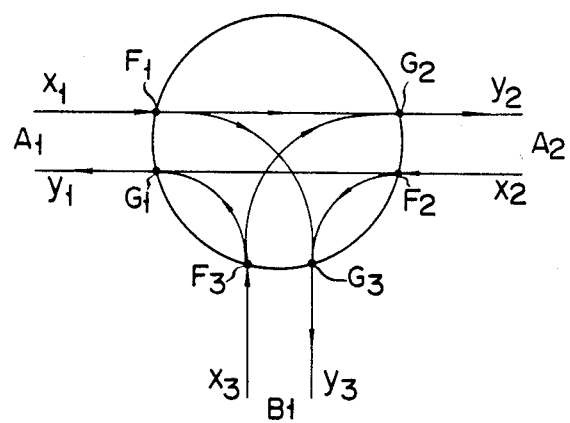
FIG. 10 shows a model of a passive optical coupler having three pairs of ports in accordance with the present invention.
Figure 8:
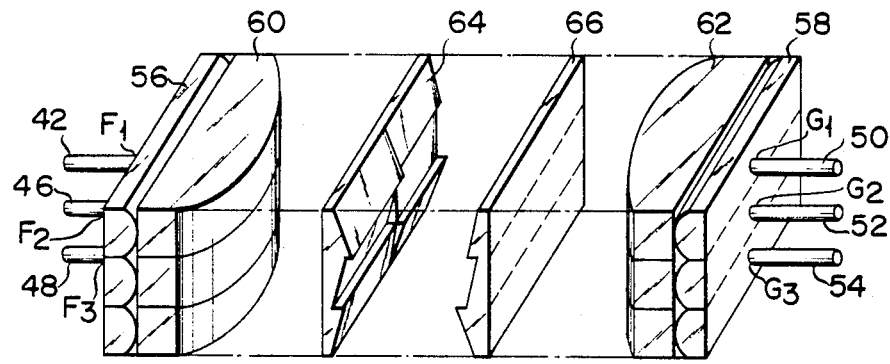
FIG. 8 shows a perspective view of one embodiment of a passive optical coupler in accordance with the present invention.
Figure 9:
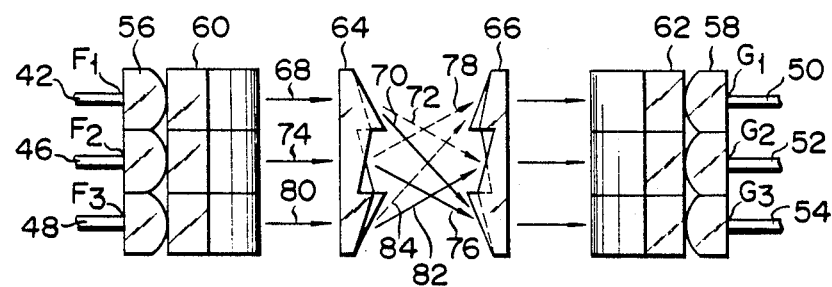
FIG. 9 shows a side view of the embodiment in FIG. 8.

At first, embodiments of the transmission type will be explained. FIGS. 8 and 9 show an optical coupler of this type, having three pairs of ports. FIG. 10 shows a schematic view of a passive optical coupler, having the characteristic by the present invention in the case of three pairs of ports. A first pair of ports comprised of input port $F_1$ and output port $G_1$ form bus port $A_1$ which may be connected to one main optical signal transmission line. A second pair of ports comprised of input port $F_2$ and output port $G_2$ form bus port $A_2$ which may be connected to another main optical signal transmission line. A third pair of ports comprised of input port $F_3$ and output port $G_3$ form branch port $B_1$ which may be connected to a branch optical transmission line. An optical signal inputted to input port $F_1$ should be outputted to output port $G_2$ and output port $G_3$. An optical signal inputted to input port $F_2$ should be outputted to output port $G_3$ and $G_1$. An optical signal inputted to input port $F_3$ should be outputted to output ports $G_1$ and $G_2$.

The optical coupler shown in FIGS. 8 and 9 has the above characteristics. Input ports $F_1$, $F_2$ and $F_3$ are associated with optical fibers 42, 46 and 48 and output ports $G_1$, $G_2$ and $G_3$ are associated with optical fibers 50, 52 and 54. Lens assemblies 56 and 58 each includes three stacked cylindrical lenses. Each of optical fibers 42, 46 and 48 is joined to one cylindrical lens of lens assembly 56, respectively. Each of optical fibers 50, 52 and 54 is joined to one cylindrical lens of lens assembly 58, respectively. Cylindrical lenses 60 and 62 and deflectors 64 and 66 are set as shown in FIGS. 8 and 9 between lens assemblies 56 and 58. Each of cylindrical lenses 60 and 62 has three cylindrical areas corresponding to each cylindrical lens of lens assemblies 56 and 58. Deflectors 64 and 66 have substantially the same structure with three deflecting areas in a direction parallel to fibers 42, 46 and 48, and two deflecting areas in the other direction making a total of six deflecting areas.

Lens assembly 56 and cylindrical lens 60 make up an input lens system and cylindrical lens 62 and lens assembly 58 constitute an output lens system. The input and output lens systems have substantially the same structure. Optical signals (light) inputted to input ports $F_1$, $F_2$, and $F_3$ are changed into three parallel collimated optical signals stacked by the input lens systems. These collimated optical signals irradiate deflector 64 and then they are deflected by it. The collimated optical signal designated by solid line arrow 68 is deflected as designated by solid line arrow 70 and dotted line arrow 72. The collimated optical signal designated line 74 is deflected as designated by solid line arrow 76 and dotted line arrow 78. The collimated optical signal designated line 80 is deflected as designated by solid line arrow 82 and dotted line arrow 84.

As a result, the above-mentioned characteristic can be designated as shown in FIG. 10. An optical signal inputted to input port $F_1$ is outputted to output ports $G_2$, $G_3$. An optical signal inputted to input port $F_2$ is outputted to output ports $G_3$, $G_1$. An optical signal inputted to input port $F_3$ is outputted to output ports $G_1$, $G_2$. The above embodiment shown in FIGS. 8 and 9 is an optical coupler having three pairs of ports. In similar conception, however, optical couplers having more pairs of ports can be realized by deflectors having more deflecting areas.

Figure 11:
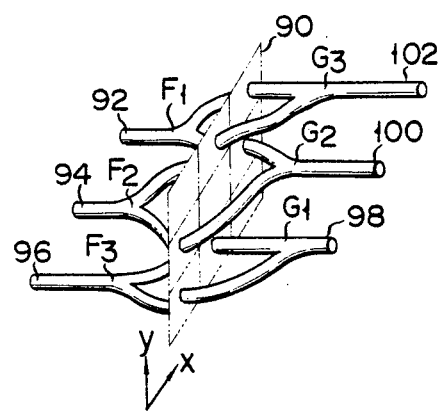
FIG. 11 shows a perspective view of another embodiment of a passive optical coupler in accordance with the present invention.

FIG. 11 shows another embodiment of the transmission type having three pairs of ports. The embodiment employs six optical fibers forming dividers such as 3 dB couplers. Each of the dividers divides an inputted optical signal into two optical signals.

Figure 12:
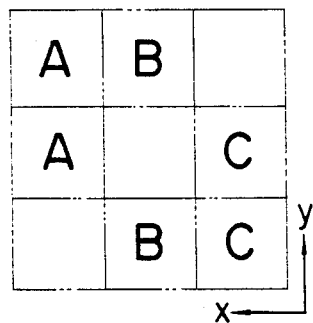
FIGS. 12 and 13 show the relationship between input ports and output ports in the embodiment shown in FIG. 11.
Figure 13:
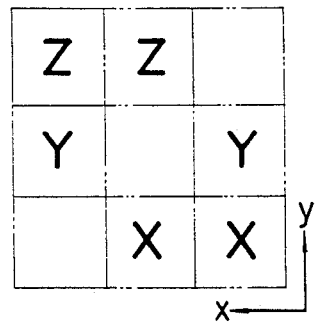

Numeral 90 designates an imaginary matrix plane having nine element areas. Three input optical fibers 92, 94 and 96 and three output optical fibers 98, 100 and 102 are connected as shown in FIGS. 12 and 13. That is, optical fibers 92, 94 and 96 are each divided in two and are connected to the A, B and C element areas, respectively, of the input side of imaginary matrix plane 90. Similarly, of optical fibers 98, 100 and 102 are each divided in two and are connected to the X, Y and Z element areas, respectively, of the output side of imaginary matrix plane 90. Since imaginary matrix plane 90 does not actually exist, fibers ending at the same location in plane 90 are actually joined. For example, two divided portions of optical fiber 92 are connected to a divided portion of optical fiber 100 and a divided portion of optical fiber 102. An optical signal passing through optical fiber 92 is divided and applied to optical fibers 100 and 102. An optical signal passing through optical fiber 94 is divided and applied to optical fibers 98 and 102. An optical signal passing through optical fiber 96 is divided and applied to optical fibers 98 and 100.

The joined portions of optical fibers 92, 94, and 96 are input ports $F_1$, $F_2$ and $F_3$ and the joined portions of optical fibers 98, 100 and 102 are output ports $G_1$, $G_2$ and $G_3$. Therefore, this optical coupler also has the characteristic shown in FIG. 10. In similar conception, optical couplers having more pairs of ports can be realized by optical fibers divided into more portions. For example, optical couplers having N pairs of ports can be realized by using optical fibers having (N−1) portions. Using optical thin film guides instead of optical fibers, it is easy to manufacture an optical coupler having many pairs of ports without optical partial distribution.

Figure 14:
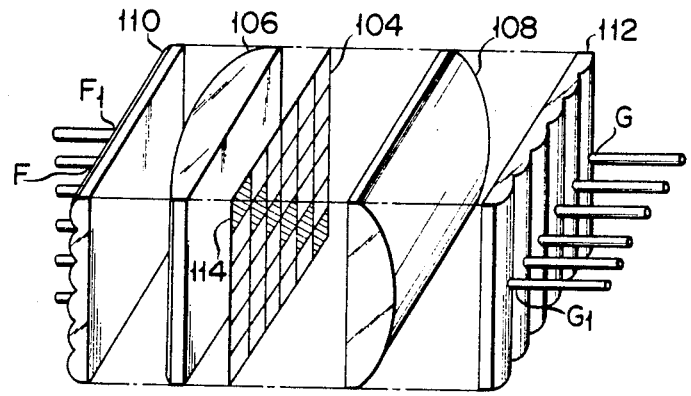
FIGS. 14 and 15 show perspective views of two other embodiments of passive optical couplers in accordance with the present invention.

FIG. 14 shows another embodiment of the transmission type. In this embodiment of the present invention, interceptor 104 having diagonal intercepting areas is used. Two cylindrical lenses 106 and 108 are placed orthogonally with respect to each other on opposite sides of interceptor 104. Two lens assemblies 110 and 112 each of which is comprised of several stacked cylindrical lenses are placed on the outside of lenses 106 and 108. An optical fiber is connected to each of stacked cylindrical lenses of lens assemblies 110 and 112. The optical fibers connected to lens assembly 110 form input ports F and the optical fibers connected to lens assembly 112 form output ports G. For example, input port $F_1$ and output port $G_1$ constitute a first pair of ports. An optical signal inputted to input port $F_1$ is intercepted by intercepting area 114 of interceptor 104 and then is not outputted to output $G_1$. Therefore, the optical coupler shown in FIG. 14 has the transfer characteristics mentioned above.

Figure 15:
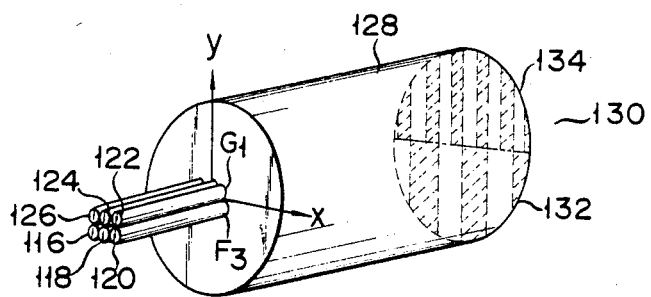

Next, several embodiments of the reflection type will be explained. FIG. 15 shows an embodiment of this type. The optical coupler uses a diffraction grating and has three pairs of ports. Numerals 116, 118 and 120 are optical fibers acting as input ports $F_1$, $F_2$ and $F_3$, respectively. Numerals 122, 124 and 126 are optical fibers acting as output port $G_1$, $G_2$ and $G_3$, respectively. Numeral 128 is a rod lens having the characteristic that its refractive index in a radial direction is directly proportional to the square of the radius. The length of rod lens 128 is one fourth of the pitch of the light. Reflector 130, including two diffraction gratings 132 and 134, is formed on rod lens 128 on the end face opposite to the end face joined to optical fibers 116 through 126.

Figure 16:
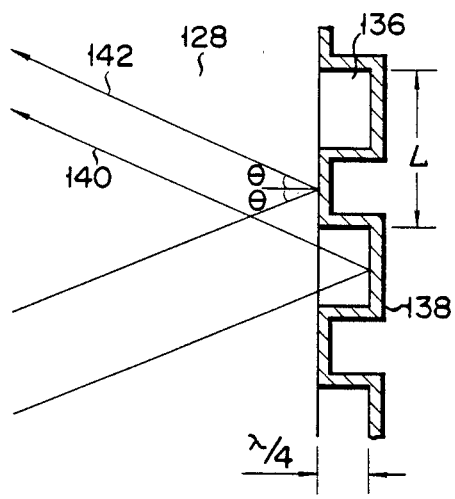
FIGS. 16 and 17 show two schematic views to explain the structure of the embodiment in FIG. 15.

Diffraction grating 132 has a grating structure of the period $L_1$ and diffraction grating 134 has a grating structure of the period $L_2$ ($=L_1/2$). FIG. 16 shows a sectional view of diffraction gratings 132 and 134. Reflector 130 is made uniformly forming thin film $SiO_2$ 136 on the end face of rod lens 128 in thickness of a quarter wavelength (g) of light. Then diffraction grating of period L($L_1$ or $L_2$) is formed by photolithography. Finally gold thin film 138 is evaporated. Zero order light diffracted by reflector 130 becomes zero, because light 140, reflected by gold thin film 138, has a phase delay of $\lambda/2$ in comparison with light 142 reflected by the end face of rod lens 128.

Figure 17:
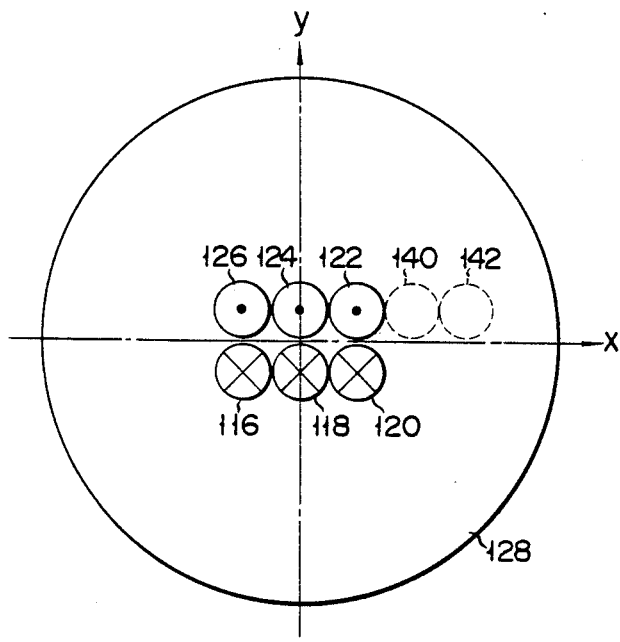

FIG. 17 shows the positional relation of optical fibers 116–126 to rod lens 128. Optical signals inputted to optical fibers 116, 118 and 120, incident on rod lens 128, are reflected by reflector 130. If reflector 130 is a simple mirror, an optical signal inputted to optical fiber 116 is reflected to optical fiber 122 placed at the position symmetrical to the position of optical fiber 116 about the zero point. However, reflector 130 is a diffraction grating, an optical signal inputted through optical fiber 116 does not reach fiber 122 because zero order light diffracted by reflector 130 is zero. First order light from fiber 116, diffracted by diffraction grating 132, is inputted to optical fiber 124 and dummy fiber 140, and first order light from fiber 116, diffracted by diffraction grating 134, is inputted to optical fiber 126 and dummy fiber 142. Thus, the spacing of fibers 116–126 determines the periods $L_1$ and $L_2$ of diffraction gratings 132 and 134. Optical signals inputted to dummy fibers 140 and 142 are absorbed.

As a result, an optical signal inputted through optical fiber 116 (i.e. input port $F_1$) is outputted to optical fibers 124 and 126 (i.e. output ports $G_2$ and $G_3$). Similarly, an optical signal inputted through optical fiber 118 (i.e. input port $F_2$) is outputted to optical fibers 122 and 126 (i.e. output ports $G_1$ and $G_3$), and an optical signal inputted through optical fiber 120 (i.e. input port $F_3$) is outputted to optical fibers 124 and 126 (i.e. output port $G_2$ and $G_3$). Thus, the optical coupler shown in FIG. 15 also has the characteristics shown in FIG. 10.

By similar conception, optical couplers having more than three pairs of ports can be realized.

Next, another embodiment of the reflection type will be explained. FIG. 18 shows an optical coupler having four pairs of ports and a reflector comprised of several reflecting faces. Generally, the transfer characteristics necessary for optical couplers having four pairs of ports in accordance with the present invention can be designated as shown in FIG. 19. Namely, the optical coupler has two bus ports $A_1$ and $A_2$ and two branch ports $B_1$ and $B_2$. An optical signal inputted to input port $F_1$ of bus port $A_1$ is outputted to three output ports $G_2$, $G_3$ and $G_4$ of bus port $A_2$ and branch ports $B_1$ and $B_2$. Similarly, an optical signal inputted to input port $F_2$ is outputted to three output ports $G_3$, $G_4$ and $G_1$. An optical signal inputted to input port $F_3$ is outputted to output ports $G_4$, $G_1$ and $G_2$ and an optical signal inputted to input port $F_4$ is outputted to output ports $G_1$, $G_2$ and $G_3$.

Figure 20:
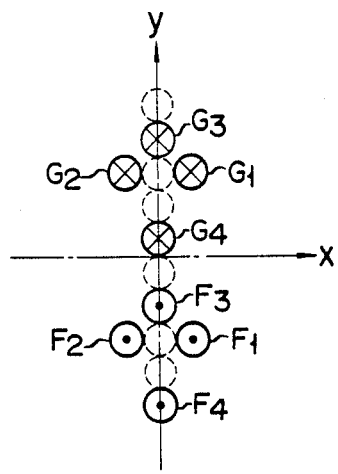
FIGS. 20 and 21 show two schematic views to explain the structure of the embodiment in FIG. 19.

The optical coupler shown in FIG. 18 has the characteristics shown in FIG. 19. Numerals 146, 148, 150 and 152 are optical fibers acting as input ports $F_1$, $F_2$, $F_3$ and $F_4$. Numerals 154, 156, 158 and 160 are optical fibers acting as output ports $G_1$, $G_2$, $G_3$ and $G_4$. FIG. 20 shows the positional relation of these input ports and output ports. Circles drawn by dotted line indicate imaginary fibers. Of course, dummy fibers can be placed in these positions. These input ports and output ports are joined to rod lens 162 having a cylindrical shape. The length of rod lens 162 is one fourth of the pitch of light. Rod lens 162 is similar to rod lens 128 shown in FIG. 15.

Figure 21:
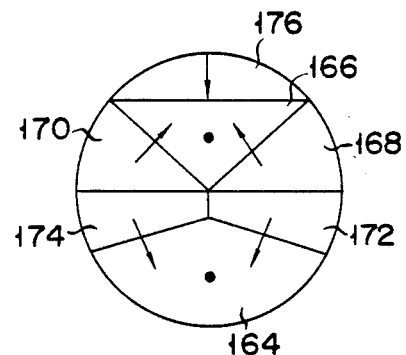

Reflector 163, including several reflecting faces, is joined to rod lens 162 on the end face opposite to the end face joined to optical fibers 146–160. Reflector 163 is comprised of reflecting faces 164, 166, 168, 170, 172, 174 and 176. FIG. 21 shows the manner in which these reflecting faces of reflector 163 are tilted about rod lens 162. Arrows shown in FIG. 21 refer to the tilting direction of these reflecting faces. Dotted reflecting faces (i.e. 164 and 166) designate faces perpendicular to the axis of rod lens 162.

FIG. 22 shows the manner in which an optical signal inputted to input port $F_1$ is reflected. Generally, an optical signal inputted at a predetermined point is reflected to the position symmetrical to the predetermined point about the zero point by reflecting faces 164 and 166. Therefore, an optical signal inputted to input port $F_1$ passes through rod lens 162 and is then reflected by reflecting faces 164 and 166 and is outputted to output port $G_2$. An arrow from $F_1$ to $G_2$ shown in FIG. 22 designates this occurrence. However, a part of the optical signal is reflected by reflecting face 170 and is outputted to output port $G_3$. Another part of the optical signal is reflected by reflecting face 174 and is outputted to output port $G_4$. As a result, an optical signal inputted to input port $F_1$ is outputted to all output ports except output port $G_1$.

FIG. 23 shows the manner in which an optical signal inputted to input port $F_2$ is reflected. An optical signal inputted to input port $F_2$ is reflected by reflecting faces 164 and 166 and is then outputted to output port $G_1$. A part of the optical signal is reflected by reflecting face 168 and is outputted to output port $G_3$. Another part of the optical signal is reflected by reflecting face 172 and is outputted to output port $G_4$.

FIG. 24 shows the manner in which an optical signal inputted to input port $F_3$ is reflected. An optical signal inputted to input port $F_3$ is reflected by reflecting faces 164 and 166 and is then outputted to an imaginary fiber. However, a part of the optical signal is reflected by reflecting face 176 and is outputted to output port $G_4$. Another part of the optical signal is reflected by reflecting face 170 and is outputted to output port $G_1$. The other part of the optical signal is reflected by reflecting face 168 and is outputted to output port $G_2$. As a result, an optical signal inputted to input port $F_3$ is outputted to all output ports except output port $G_3$.

FIG. 25 shows the manner in which an optical signal inputted to input port $F_4$ is reflected. An optical signal inputted to input port $F_4$ is reflected by reflecting faces 164 and 166 and is then outputted to an imaginary fiber. However, a part of the optical signal is reflected by reflecting face 174 and is outputted to output port $G_1$. Another part of the optical signal is reflected by reflecting face 172 and is then outputted to output port $G_2$. The other part of the optical signal is reflected by reflecting face 176 and is outputted to output port $G_3$. As a result, the optical coupler shown in FIG. 18 has the characteristic shown in FIG. 19. It is easy to manufacture the optical coupler shown in FIG. 18 because one face of reflector 163 is a simple plane, perpendicular to the axis of rod lens 162.

Figure 26:
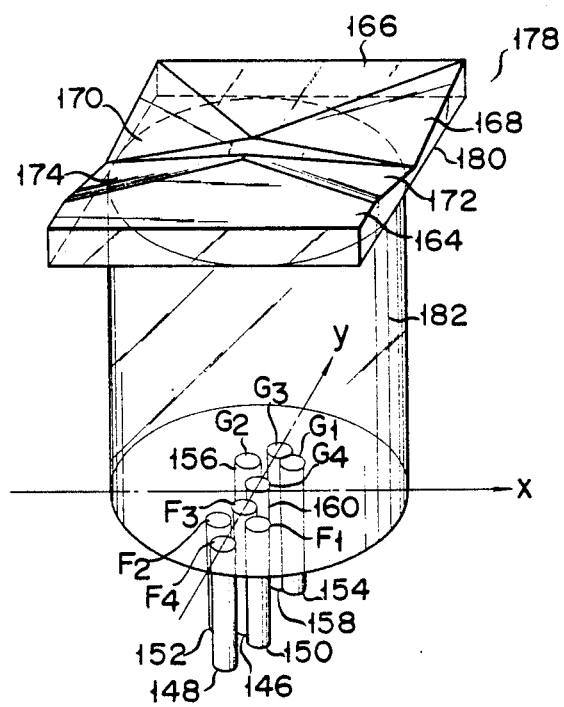
FIG. 26 shows a perspective view of yet another embodiment of an optical coupler of the reflection type in accordance with the present invention.
Figure 27:
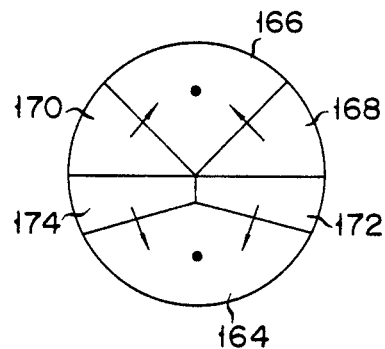
FIGS. 27 and 28 show schematic views to explain the operation of reflector 178 shown in FIG. 26.
Figure 28:
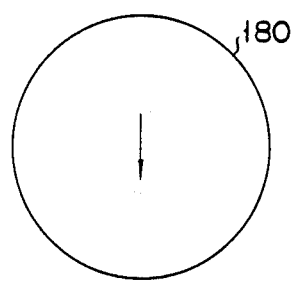

However, it is possible to use a reflector having a reflecting face on the face joined to the rod lens. FIG. 26 shows this kind of the embodiment of the present invention. Reflector 178 has reflecting face 180 corresponding to reflecting face 176 shown in FIG. 18 on the face joined to rod lens 182. Namely, reflector 178 has reflecting faces 164, 166, 168, 170, 172 and 174 on one face away from rod lens 182 and has reflecting face 180 adjacent rod lens 182 as shown in FIGS. 27 and 28. Arrows shown in FIGS. 27 and 28 designate the manner in which these reflecting faces tilt incident light. In this case, reflecting face 180 must have the characteristic that a part of the incident optical signal is reflected (e.g. 1%) and another part of the optical signal passes through it. An optical signal is reflected in the $-y$ direction by reflecting face 180 instead of reflecting face 176. Therefore, a part of the optical signal inputted to input port $F_3$ is reflected by reflecting faces 164, 166 and 180 and outputted to output port $G_4$. A part of the optical signal inputted to input port $F_4$ is reflected by reflecting faces 164, 166 and 180 and outputted to output port $G_3$.

It is easy to manufacture the optical coupler shown in FIG. 26 because the number of reflecting faces on one face of reflector 178 is smaller than that of reflector 163. The optical coupler in FIG. 26 has the advantage of eliminating unnecessary optical coupling, too.

Figure 29:
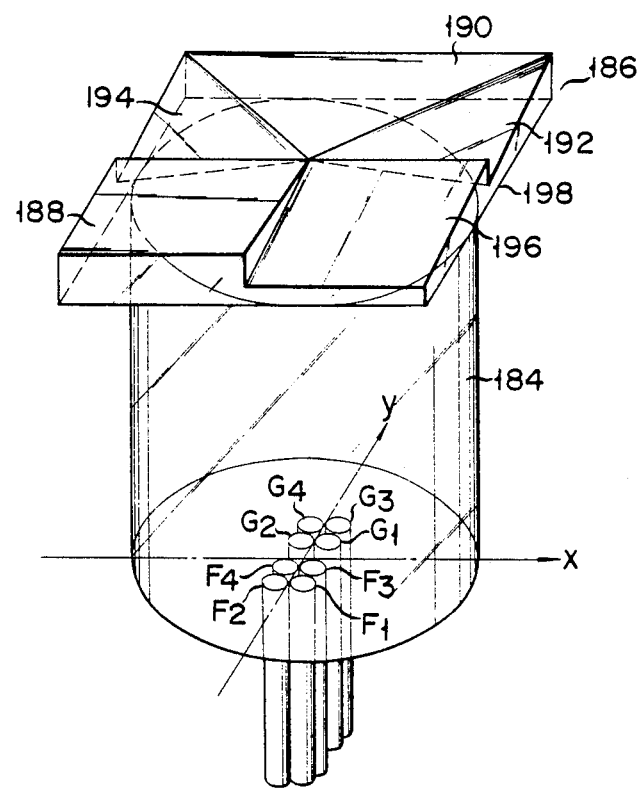
FIG. 29 shows a perspective view of still another embodiment of an optical coupler of the reflection type in accordance with the present invention.

FIG. 29 shows another embodiment of a reflection type optical coupler having four pairs of ports. Eight optical fibers form input ports $F_1$, $F_2$, $F_3$, $F_4$ and output ports $G_1$, $G_2$, $G_3$, $G_4$. These optical fibers are joined to one end face of rod lens 184. Rod lens 184 is similar to rod lens 162 shown in FIG. 18. Reflector 186 is joined to rod lens 184 on the opposite end face of lens 162 and has six reflecting faces 188, 190, 192, 194, 196 and 198.

FIG. 30 shows the positional relationship of input ports $F_1$, $F_2$, $F_3$, $F_4$ and output ports $G_1$, $G_2$, $G_3$, $G_4$. FIG. 31 shows the manner in which reflecting faces 188, 190, 192, 194 and 196 tilt light, and FIG. 32 shows the manner in which reflecting face 198 tilts light.

Figure 33:
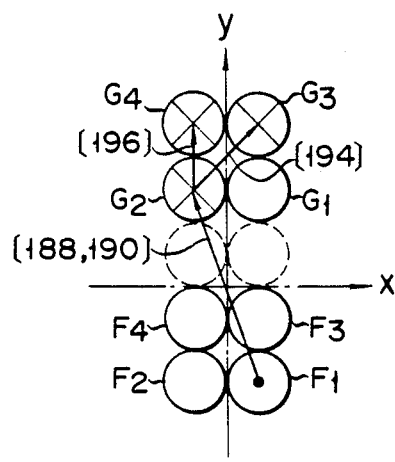
FIGS. 33, 34, 35 and 36 show schematic views to explain the reflecting condition of optical signals inputted to input ports on the embodiment shown in FIG. 29.

FIG. 33 shows the manner in which an optical signal inputted to input port $F_1$ of the optical coupler shown in FIG. 29 is reflected. The optical signal is reflected by reflecting faces 188 and 190 and is outputted to output port $G_2$. A part of the optical signal is reflected also by reflecting face 194 and is outputted to output port $G_3$. Another part of the optical signal is reflected by reflecting face 196 and is outputted to output port $G_4$.

Figure 34:
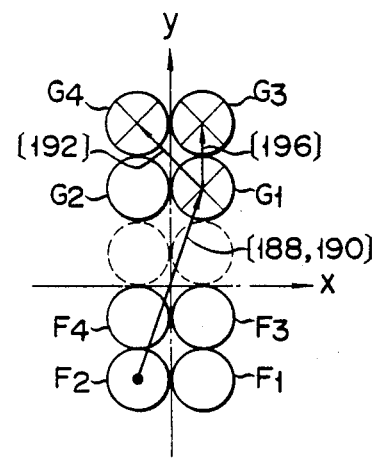

FIG. 34 shows the manner in which an optical signal inputted to input port $F_2$ is reflected. The optical signal is reflected by reflecting faces 188 and 190 and is outputted to output port $G_1$. A part of the optical signal is reflected by reflecting face 196 and is outputted to output port $G_3$. Another part of the optical signal is reflected by reflecting face 192 and is outputted to output port $G_4$.

Figure 35:
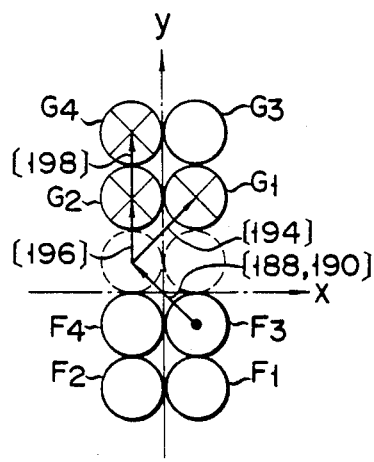

FIG. 35 shows the manner in which an optical signal inputted to input port $F_3$ is reflected. The optical signal is reflected by reflecting faces 188 and 190 to a dummy port. A part of the optical signal is reflected by reflecting face 194 and is outputted to output port $G_1$. Another part of the optical signal is reflected by reflecting face 196 and is outputted to output port $G_2$. Further, a part of the optical signal is reflected by reflecting face 198 and is outputted to output port $G_4$. Thus, an optical signal inputted to input port $F_3$ is outputted to all output ports except output port $G_3$.

Figure 36:
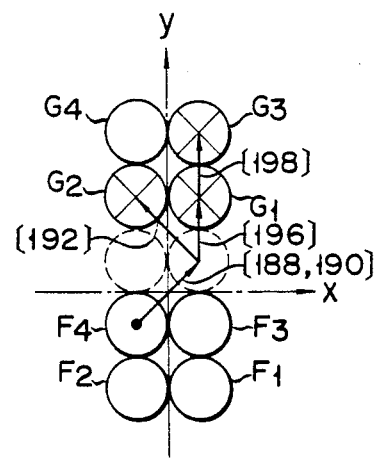

FIG. 36 shows the manner in which an optical signal inputted to input port $F_4$ is reflected. The optical signal is reflected by reflecting faces 188 and 190 to a dummy port. A part of the optical signal is reflected by reflecting face 192 and is outputted to output port $G_2$. Another part of the optical signal is reflected by reflecting face 196 and is outputted to output port $G_1$. Further, a part of the optical signal is reflected by reflecting face 198 and is outputted to output port $G_3$. Thus, an optical signal inputted to input port $F_4$ is not outputted to output port $G_4$. As a result, the optical coupler shown in FIG. 29 also has the characteristics shown in FIG. 19. Reflector 186 is advantageous in that it has smaller reflecting faces than reflector 178 or reflector 163.

Figure 37:
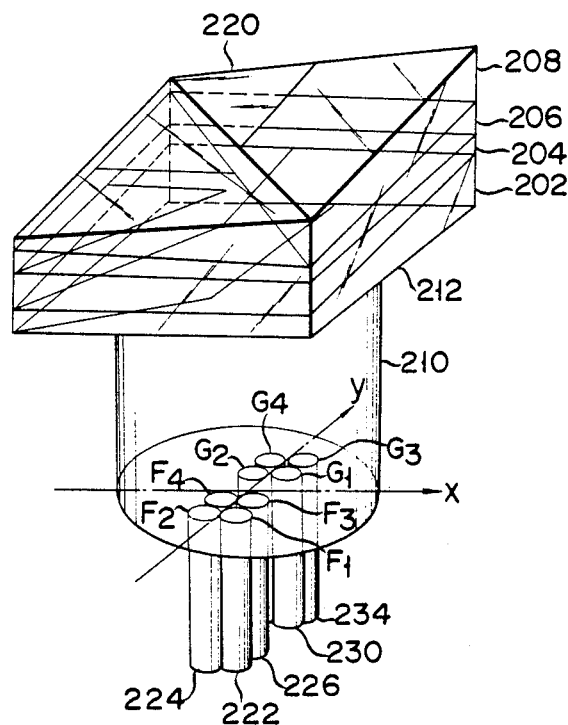
FIG. 37 shows a perspective view of another embodiment of a reflection type optical coupler in accordance with the present invention.

FIG. 37 shows another embodiment of the reflection type. The optical coupler has four reflecting plates 202, 204, 206 and 208. These reflecting plates are stacked on one end face of rod lens 162 similar to rod lens 162.

Figure 38:
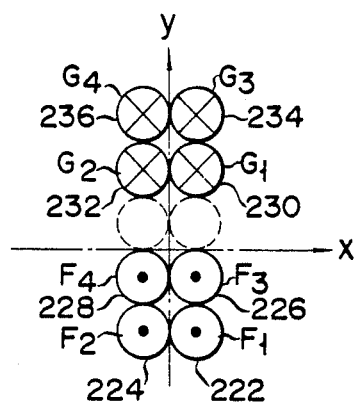
FIGS. 38, 39, 40, 41 and 42 show schematic views to explain the structure of the embodiment shown in FIG. 37.

Eight optical fibers, forming input ports $F_1$, $F_2$, $F_3$ and $F_4$ and output ports $G_1$, $G_2$, $G_3$ and $G_4$, are joined to the other end face of rod lens 210. FIG. 38 shows the positional relationship of these input ports and output ports (e.g. optical fibers 222-236). The two circles drawn by dotted line indicate imaginary fibers.

Figure 39:
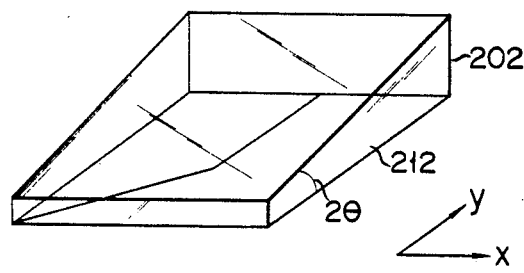
Figure 43:
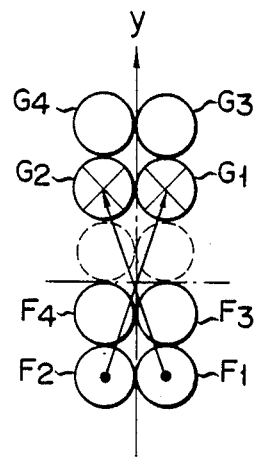
FIGS. 43, 44, 45, 46, 47 and 48 show schematic views to explain the reflecting condition of optical signals inputted to input ports on the embodiment shown in FIG. 37.

FIG. 39 shows reflecting plate 202 directly joined to rod lens 210. The upside face and the downside face of plate 202 form an angle of $2\theta$ in the y direction. Reflecting face 212 of the downside face is reflective. Here $\theta$ means the angle by which an optical signal is displaced with the length of adjacent optical fibers. Reflecting face 212 is perpendicular to the axis of rod lens 210. Therefore, an optical signal inputted to input port $F_1$ is reflected by reflecting face 212 and is outputted to output port $G_2$ as shown in FIG. 43. Similarly, an optical signal inputted to input port $F_2$ is reflected by reflecting face 212 and is outputted to output port $G_1$.

Figure 40:
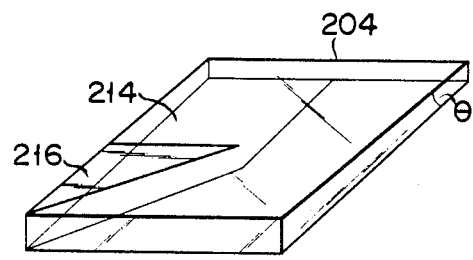

Reflecting plate 204, placed on reflecting plate 202, has an upside face and a downside face which form an angle of $\theta$ in the $-y$ direction. The plate has two reflecting faces 214 and 216 as shown in FIG. 40 on opposite sides. Reflecting face 214 is formed by a film having a small reflection coefficient, for example 1%, as compared to the other reflecting faces.

Figure 44:
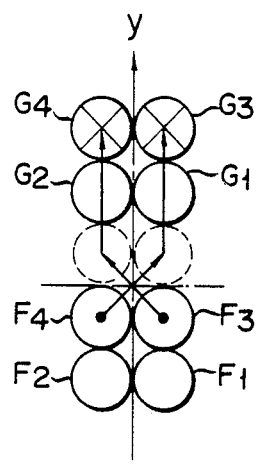

The downside face of reflecting plate 204 is at an angle of $2\theta$ with respect to the end face of rod lens 210. Therefore, an optical signal inputted to input port $F_3$ is reflected by reflecting faces 212 and 214 and is outputted to output port $G_4$ as shown in FIG. 44. An optical signal inputted to input port $F_4$ is reflected by these reflecting faces and is outputted to output port $G_3$.

Figure 45:
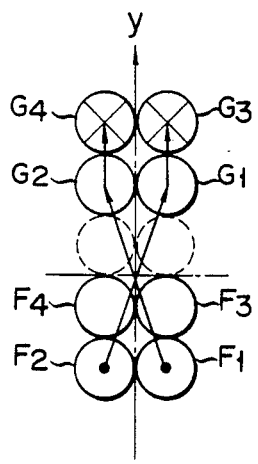

The upside face of reflecting plate 204 is at an angle of $2\theta - \theta = \theta$ with respect to the end face of rod lens 210. Therefore, an optical signal inputted to input port $F_1$ is reflected by reflecting faces 212 and 216 and is outputted to output port $G_4$ as shown in FIG. 45. An optical signal inputted to input port $F_2$ is reflected by these reflecting faces and is outputted to output port $G_3$.

Figure 46:
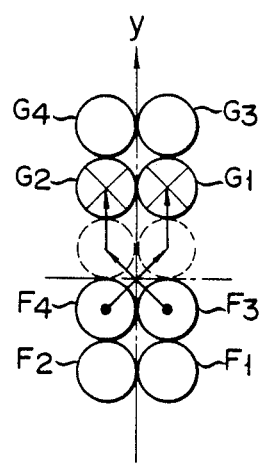

On the other hand, an optical signal inputted to input port $F_3$ is reflected by reflecting faces 212, 216 and is outputted to output port $G_2$ as shown in FIG. 46. An optical signal inputted to input port $F_4$ is reflected by these reflecting faces and is outputted to output port $G_1$.

Figure 41:
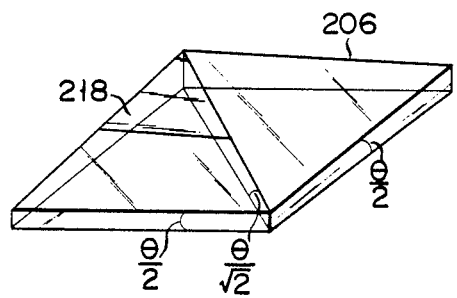
Figure 47:
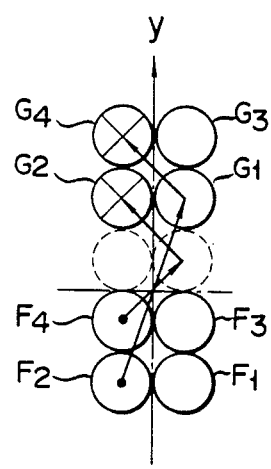

Reflecting plate 206, stacked on reflecting plate 204, has an upside face and a downside face which form an angle of $\theta/2$ in both the $-x$ direction and in the y direction, and an angle of $0/\sqrt{2}$ the diagonal direction as shown in FIG. 41. The plate has reflecting face 218 on the upside face. As shown in FIG. 47, an optical signal inputted to input port $F_2$ is reflected by reflecting faces 212 and 218 and is ouputted to output port $G_4$. An optical signal inputted to input port $F_4$ is also reflected by these reflecting faces and is outputted to output port $G_2$.

Figure 42:
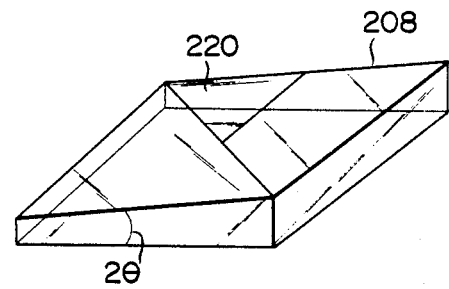
Figure 48:
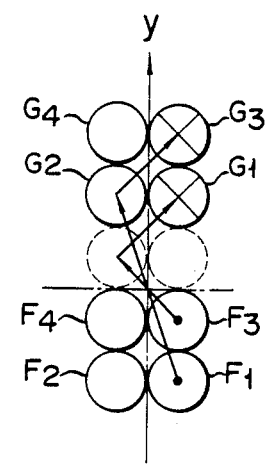

Reflecting plate 208 stacked on reflecting plate 206 has an upside face and a downside face which form an angle of $2\theta$ in the direction as shown in FIG. 42. The plate has reflecting face 220 on the upside face. As shown in FIG. 48, an optical signal inputted to input port $F_1$ is reflected by reflecting faces 212 and 220 and is outputted to output port $G_3$. An optical signal inputted to input port $F_3$ is also reflected by these reflecting faces and is outputted to output port $G_1$.

The reflecting surfaces cooperate, for example, so that an optical signal inputted to input port $F_3$ is reflected and outputted to output ports $G_4$, $G_2$ and $G_1$ as shown in FIGS. 44, 46 and 48. As a result, the optical coupler shown in FIG. 37 also has the characteristic shown in FIG. 19.

The optical coupler shown in FIG. 37 has large flexibility because the reflector is comprised of several reflecting plates having reflecting faces.

Rod lenses 128, 162, 182, 184 and 210 are used in these embodiments. However, optical transmitting means equivalent to these rod lenses can be used.

Obviously, many modifications and variations of the present invention are possible in the light of the above teachings. It is therefore to be understood that within the scope of the appended claims, this invention may be practiced otherwise than as specifically described.

What is claimed is:

1. An optical communication system comprising:
    a plurality of stations, each of said stations including means for generating and processing optical signals;
    at least two passive optical coupler means, each of said coupler means having a plurality of pairs of ports, at least two of said pairs of ports of each of said coupler means each being connected to one of said stations, respectively, each of said pairs including an input port and an output port, each of said coupler means for causing an optical signal inputted to any one of said input ports to be outputted to all of said output ports except said output port corresponding to said input port receiving said optical signal;
    a plurality of optical signal transmission lines interconnecting said passive optical couplers for two-way transfer of said optical signals between said couplers; and
    a plurality of optical signal transmission lines connecting said stations to said coupler means for two-way transfer of said optical signals therebetween.

2. An optical communication system in accordance with claim 1, wherein each of said coupler means comprises:
    an input lens system changing optical signals inputted to each of said input ports into a collimated optical signal;
    deflector means for deflecting each of said collimated optical signals; and
    an output lens system transferring each of said collimated optical signals deflected by said deflector means into said output ports.

3. An optical communication system in accordance with claim 2, wherein said input lens system is substantially the same structure as said output lens system and said deflector means comprises two deflectors which are substantially the same structure.

4. An optical communication system in accordance with claim 1, wherein each of said coupler means comprises:
    an input lens system changing optical signals inputted into each of said input ports into a collimated optical signal;
    an output lens system transferring each of said collimated optical signals into said output port; and
    intercepting means, placed between said input lens system and said output lens system, for interrupting said collimated optical signals so that an optical signal inputted to any one of said input ports does not reach a corresponding one of said output ports.

5. An optical communication system in accordance with claim 1, wherein each of said input ports and each of said output ports of each of said coupler means is branched, each of said input ports being connected to all of said output ports except the one of said output ports of the same pair.

6. An optical communication system in accordance with claim 1, wherein each of said coupler means comprises:
reflecting means facing said pairs of ports, for reflecting an optical signal inputted to any one of said input ports to all of said output ports except said output port corresponding to said input port receiving said optical signal; and
optical transmitting means placed between said pairs of ports and said reflecting means, for transmitting an optical signal inputted to one of said input ports to said reflecting means and transmitting an optical signal from said reflecting means to said output ports.

7. An optical communication system in accordance with claim 6, wherein said optical transmitting means is a rod lens.

8. An optical communication system in accordance with claim 7, wherein said reflecting means includes a plurality of diffraction gratings.

9. An optical communication system in accordance with claim 6, wherein said reflecting means includes a polyhedron having a plurality of reflecting faces.

10. An optical communication system in accordance with claim 9, wherein all said reflecting faces of said reflecting means are formed on a face of said polyhedron joined to said optical transmitting means.

11. An optical communication system in accordance with claim 9, wherein at least one of said reflecting faces is formed on a face of said polyhedron joined to said optical transmitting means.

12. An optical communication system in accordance with claim 6, wherein said reflecting means is comprised of a plurality of reflecting plates having reflecting faces.

13. A passive optical coupler comprising:
at least four pairs of ports, each of said pairs including an input port and an output port; and
optical means for causing optical signals inputted to each of said input ports to be outputted to all of said output ports except said output port corresponding to said input port receiving said optical signal.

14. A passive optical coupler in accordance with claim 13, wherein said optical means comprises:
an input lens system changing optical signals inputted to each of said input ports into a collimated optical signal;
deflector means for deflecting each of said collimated optical signals; and
an output lens system transferring each of said collimated optical signals deflected by said deflector means into said output ports.

15. A passive optical coupler in accordance with claim 14, wherein said input lens system is substantially the same structure as said output lens system and said deflector means comprises two deflectors which are of substantially the same structure.

16. A passive optical coupler in accordance with claim 13, wherein said optical means comprises:
an input lens system changing optical signals inputted to each of said input ports into a collimated optical signal;
an output lens system transfering each of said collimated optical signals into said output ports; and
intercepting means, placed between said input lens system and said output lens system, for interrupting said collimated optical signals so that an optical signal inputted to any one of said input ports does not reach a corresponding one of said output ports.

17. A passive optical coupler comprising at least four pairs of ports, each of said pairs including an input port and output port, each of said input ports and said output ports being branched, each of said input ports being connected to all of said output ports except the one of said output ports of the same pair.

18. A passive optical coupler comprising:
at least four pairs of ports, each of said pairs including an input port and an output port;
reflecting means facing said pairs of ports, for reflecting an optical signal inputted to any one said input ports to all of said output ports except said output port corresponding to said input port receiving said optical signal; and
optical transmitting means placed between said pairs of ports and said reflecting means, for transmitting an optical signal inputted to one of said input ports to said reflecting means and transmitting an optical signal from said reflecting means to said output ports.

19. A passive optical coupler in accordance with claim 18, wherein said optical transmitting means is a rod lens.

20. A passive optical coupler in accordance with claim 19, wherein said reflecting means includes a plurality of diffraction gratings.

21. A passive optical coupler in accordance with claim 18, wherein said reflecting means includes a polyhedron having a plurality of reflecting faces.

22. A passive optical coupler in accordance with claim 21, wherein all said reflecting faces of said reflecting means are formed on a face of said polyhedron opposite to a face of said polyhedron joined to said optical transmitting means.

23. A passive optical coupler in accordance with claim 21, wherein at least one of said reflecting faces is formed on a face of said polyhedron joined to said optical transmitting means.

24. A passive optical coupler in accordance with claim 18, wherein said reflecting means is comprised of a plurality of reflecting plates having reflecting faces.

* * * * *